US005509955A

United States Patent [19]

Garrett et al.

[11] Patent Number: 5,509,955

[45] Date of Patent: Apr. 23, 1996

[54] TREATMENT OF LIQUIDS

[75] Inventors: Michael E. Garrett, Woking; Arthur G. Boon, Stevenage, both of England

[73] Assignee: The BOC Group plc, Windlesham, England

[21] Appl. No.: 104,316

[22] Filed: Aug. 9, 1993

[30] Foreign Application Priority Data

| | | | |
|---|---|---|---|
| Aug. 17, 1992 | [GB] | United Kingdom | 92174804 |
| Sep. 4, 1992 | [GB] | United Kingdom | 92187673 |

[51] Int. Cl.[6] .......... B01D 53/047; B01D 19/00

[52] U.S. Cl. .......... 95/96; 95/130; 95/263; 210/631

[58] Field of Search .......... 95/96, 130, 263; 96/108, 121, 202; 210/153, 170, 188, 218, 220, 221.2, 620, 621, 626, 631

[56] References Cited

U.S. PATENT DOCUMENTS

| | | | |
|---|---|---|---|
| Re. 29,782 | 9/1978 | McWhirter | 210/220 X |
| 3,748,262 | 7/1973 | Lee et al. | 210/218 X |
| 3,805,481 | 4/1974 | Armstrong | 210/220 X |
| 3,856,671 | 12/1974 | Lee et al. | 210/192 X |
| 4,043,771 | 8/1977 | Anand | 210/220 X |
| 4,219,424 | 8/1980 | Tamura et al. | 210/218 X |
| 4,272,379 | 6/1981 | Pollock | 210/220 X |
| 4,278,546 | 7/1981 | Roesler | 210/220 X |
| 4,279,754 | 7/1981 | Pollock | 210/170 X |
| 4,287,070 | 9/1981 | Pollock | 210/220 X |
| 4,304,665 | 12/1981 | Hines | 210/220 X |
| 4,308,144 | 12/1981 | Saito | 210/220 X |
| 4,338,197 | 7/1982 | Bolton | 210/220 X |
| 4,351,730 | 9/1982 | Bailey et al. | 210/170 X |
| 4,407,718 | 10/1983 | Pollock | 210/220 X |
| 4,416,781 | 11/1983 | Bailey et al. | 210/170 X |
| 4,425,231 | 1/1984 | Fujimoto et al. | 210/170 X |

FOREIGN PATENT DOCUMENTS

| | | | |
|---|---|---|---|
| 0262449 | 4/1988 | European Pat. Off. . | |
| 2239000 | 2/1973 | Germany | 210/188 |
| 2926441 | 1/1981 | Germany . | |
| 57-180490 | 11/1982 | Japan | 210/170 |
| 4-040295 | 2/1992 | Japan | 210/188 |
| 2128175 | 4/1984 | United Kingdom . | |
| 2236103 | 3/1991 | United Kingdom | 210/188 |

*Primary Examiner*—Robert Spitzer

*Attorney, Agent, or Firm*—R. Hain Swope; David A. Draggert; Larry R. Cassett

[57] ABSTRACT

A method and apparatus suitable for sweetening sewerage which avoids the need for pumping the sewerage. The method comprises the steps of passing the sewerage under a gas-tight enclosure and causing it to fall as a stream through a first passageway, passing bubbles of a gas, such as oxygen, up through the descending sewerage to dissolve in the liquid stream to form a gas-liquid stream and causing the gas-liquid stream to ascend through a second passageway in which further bubbles of the gas are passed therethrough to dissolve further gas in the stream to balance the liquid density in the descending and ascending streams.

11 Claims, 2 Drawing Sheets

30 28 20 26 24 22 4 8 6 2 12 18 14 16 10 21 23

TREATMENT OF LIQUIDS

TECHNICAL FIELD

The present invention relates to methods and apparatus for dissolving a gas in a liquid and more particularly to the treatment of liquid sewage using an oxygen rich gas.

SUMMARY OF THE INVENTION

The present invention is directed generally to a method and apparatus for dissolving a gas in a liquid as the liquid passes through a descending and then an ascending passageway. As a consequence of the present invention, the need for costly pumps to generate a flow of liquid is substantially reduced. In addition, the density of the streams in the respective descending and ascending passageways can be operated with zero pressure drop on the liquid.

According to one aspect of the present invention there is provided a method of dissolving a gas in a liquid comprising the steps of:

a) passing the liquid under a gas-tight enclosure;
b) causing the liquid to descend as a stream within the gas-tight enclosure through a first passageway;
c) passing bubbles of the gas from a source up through the descending liquid stream to dissolve the gas in the liquid stream to thereby form a gas-liquid stream;
d) causing the gas-liquid stream to ascend through a second passageway within the gas-tight enclosure; and
e) passing bubbles of said gas up through the ascending gas-liquid stream in said second passageway to thereby dissolve a further quantity of said gas in the gas-liquid stream and to balance the liquid density in the descending and ascending streams.

According to a further aspect of the present invention an apparatus for dissolving a gas in a liquid comprises a first conduit for the passage of said liquid from a source, at least a portion of the first conduit extending under a gas-tight enclosure such as a gas-tight hood, first and second passageways descending from under the gas-tight enclosure, and means for introducing the gas at a location at or adjacent to the bottom ends of the first and second passageways, such that liquid passing along the first and second passageways is contacted by the gas to form a gas-liquid stream, and any undissolved gas which may rise through the liquid in the first and second passageways is trapped under the gas-tight enclosure.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a method and apparatus for dissolving a gas in a liquid. In an embodiment of the invention as shown in FIGS. 1–3, the liquid is liquid sewage and the gas is an oxygen rich gas which may optionally be obtained from a pressure swing adsorption system.

Figure 1:
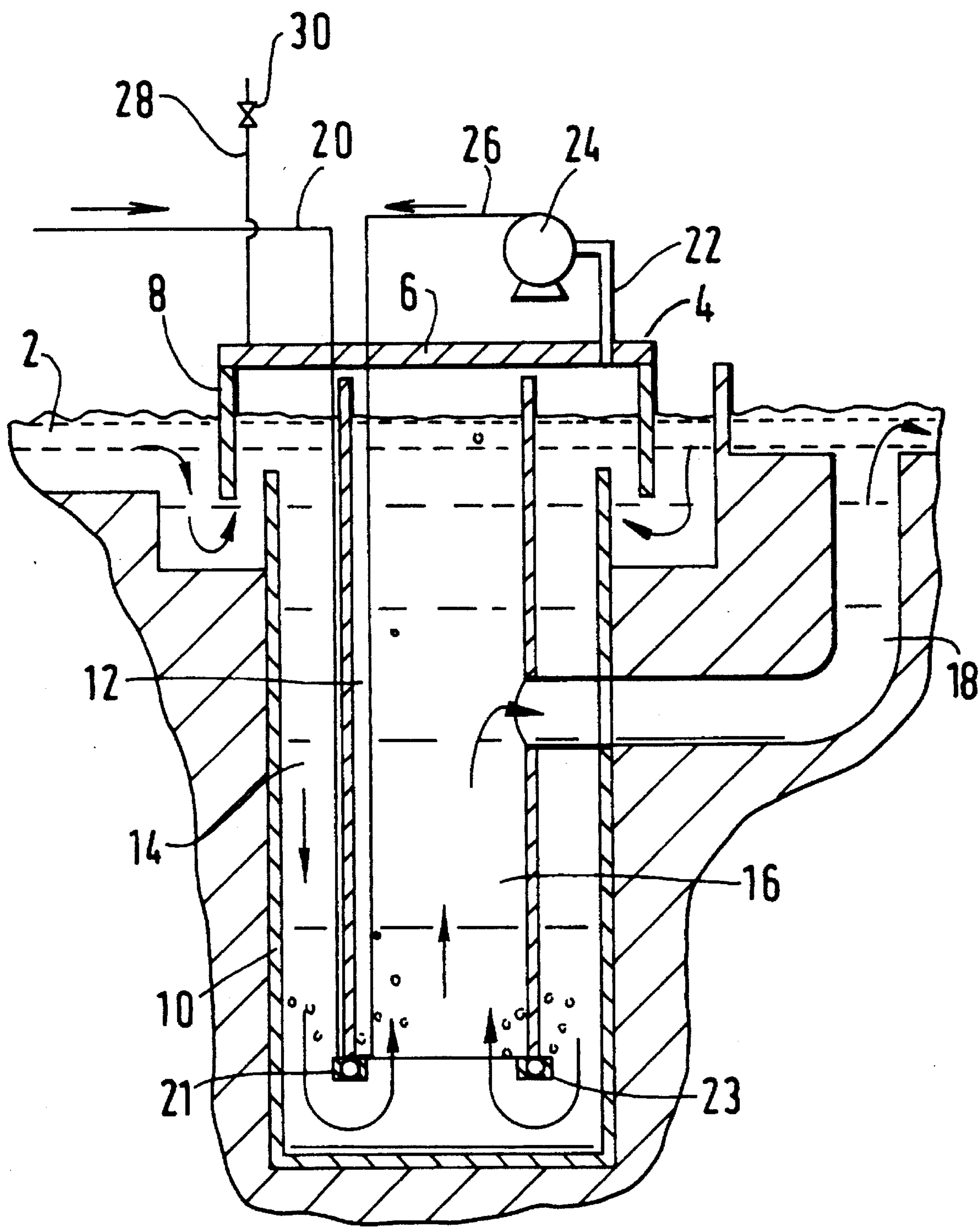
FIG. 1 is a schematic cross-sectional view of an embodiment of the apparatus of the invention for dissolving gas in a liquid.
Figure 2:
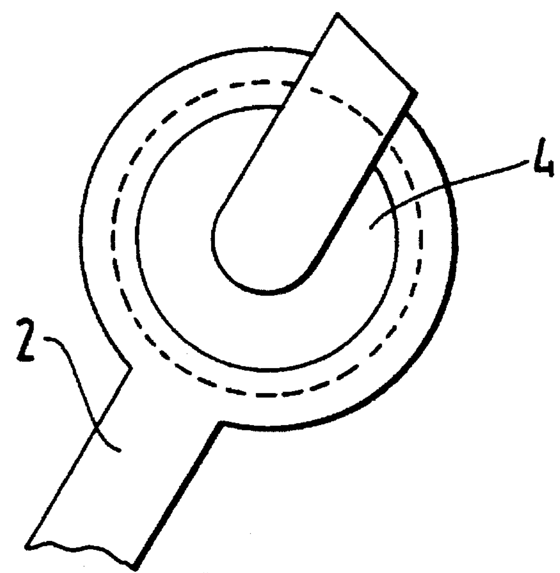
FIG. 2 is a plan view of the apparatus of FIG. 1.
Figure 3:
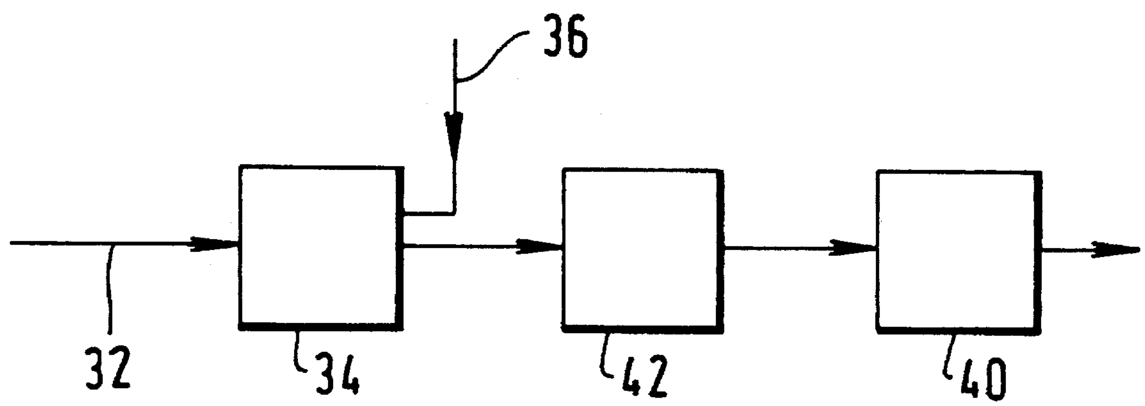
FIG. 3 is a schematic flow diagram illustrating the use of a pressure swing adsorption system to supply an oxygen rich gas to the embodiment shown in FIG. 1.

Referring specifically to FIGS. 1 and 2, an apparatus for dissolving a gas, for example an oxygen rich gas mixture, in a liquid such as liquid sewage comprises a first conduit 2 which, as shown most clearly in FIG. 2, extends around and under a gas-tight enclosure such as a gas-tight hood 4 comprising an upper part 6 from which depends a skirt 8.

Located immediately beneath the hood 4 are two concentric pipes, namely a first outer pipe 10 and spaced inwardly therefrom a second inner pipe 12. The inner surface of pipe 10 defines with the outer surface of pipe 12 an annular first passageway 14. As will be explained hereinafter, the inner surface of pipe 12 defines a second passageway 16. The upper end of pipe 12 extends upwardly beyond the upper end of pipe 10 so that the liquid sewage will first flow downwardly along the first passageway 14.

The first conduit 2 provides a source of the liquid sewage. A second conduit 18 is provided in fluid communication at one end with the passageway 16 and at its other end with the conduit 2 downstream of the hood 4 to deliver the resulting gas-liquid stream away from the passageway 16.

An oxygen rich gas is provided to the apparatus of the invention through line 20 which extends from a source (not shown) to a first outlet 21 located adjacent to the bottom end of the first and second passageways 14, 16.

Undissolved gas which passes through the liquid in the passageways 14, 16 may accumulate under the hood 4. This undissolved gas is recycled to a second outlet 23 located at the bottom end of the second passageway 16. Recycling is accomplished by passing the undissolved gas through a line 22, extending from the underside of hood 4, by means of a pump 24. The outlet from the pump 24 is in fluid communication via a line 26 with the second outlet 23. Excess undissolved gas may be removed from the apparatus by a vent line 28 which is in fluid communication with the underside of the hood 4 and is controlled by a valve 30.

The operation of the apparatus in accordance with the invention will now be described. Sewage flowing through the first conduit 2 flows under the skirt 8 of the hood 4 and in the channel formed between the skirt 8 and the upper end of the pipe 10. The sewage then rises above and over the pipe 10 and down the annular passageway 14 formed between the concentric pipes 10, 12.

The oxygen rich gas from the source (not shown) is introduced into the downward flowing liquid stream via the line 20 and the outlet 21. The bubbles of the oxygen rich gas rise up against the downward flow of the liquid stream passing through the passageway 14 since the limiting rise velocity of the gas is higher than the downward velocity of the liquid stream. As a consequence of the countercurrent flow of the gas to the descending liquid stream, at least some of the gas will dissolve in the liquid stream during its descent. The resulting gas-liquid stream thus formed on reaching the bottom of the first passageway 14 next flows upwardly through the second passageway 16 as indicated by the arrow.

Any undissolved oxygen rich gas which passes through the liquid in the passageways 14, 16 is trapped under the hood 4. The trapped gas is recycled by the pump 24 which draws the trapped gas from the underside of the hood 4 through line 22 and reintroduces the gas into the gas-liquid stream ascending the passageway 16 via the line 26 and the outlet 23.

The gas introduced into the upward flowing gas-liquid stream from the outlet 23 helps to balance the density of the downward flowing liquid stream to thereby avoid excess pressure drop. The gas-liquid stream then leaves the passageway 16 downstream of the hood 4 via the second conduit 18.

Gradually the gas under the hood 4 will become enriched in nitrogen and this nitrogen enriched gas will need to be bled off periodically to avoid pressure build up. Removal of the nitrogen enriched gas is made through the vent 28 and valve 30.

EXAMPLE

When suitably dimensioned, the embodiment of the apparatus described above is capable of treating a flow rate of approximately 200 million gallons of sewage per day. The pipes 10, 12 are so dimensioned that the flow velocity of the sewage down the passageway 14 is preferably no more than 0.2m per second. The oxygen rich gas introduced via the outlet 21 forms bubbles which rise up against the downward flow of the liquid because the limiting rise velocity of the gas is 0.3m per second. With pipes having a length of about 5m this means that the gas bubbles will be in contact with the liquid sewage for a period of 50 seconds. The sewage when ascending upwardly via passageway 16 has its velocity raised to 0.6m per second so that detritus is carried along with the flow.

An alternative method of operating the apparatus shown in FIGS. 1 and 2 of the accompanying drawings is to employ a pressure swing adsorption (PSA) system to generate an oxygen rich feed gas. For example, the PSA system may be used by withdrawing a stream of the undissolved oxygen rich gas from the hood 4, for example, via the vent 28 and valve 30 and to supply, as a supplementary feed gas, the stream of oxygen rich gas to a Pressure Swing Adsorption (PSA) system (not shown in FIGS. 1 and 2) for separating oxygen from air. The more highly purified oxygen stream obtained from the PSA system is then sent to the first passageway 14. The PSA system may be used as a source of at least a portion of oxygen supplied to the apparatus shown in FIGS. 1 and 2. By returning oxygen from under the hood 4 to the PSA system, waste of oxygen is reduced.

There are a number of different stages in a PSA cycle which can be utilized for producing oxygen from the oxygen rich gas stream taken from under the hood 4. For example, in a method of producing an oxygen rich product stream according to EP-A-0 449 448, incorporated herein by reference, the oxygen rich gas may be introduced into the column A at its feed end during a period of time that extends between the end of step (i) and the start of step (iii), preferably either during a period between the end of step (ii) and the start of step (iii) or simultaneously with step (ii). Typically, while the oxygen rich gas is being fed to the feed end of the column A, a portion of the product stream is introduced into the product end of the second column B to purge the second column and gas is simultaneously withdrawn from the feed end of the second column B to desorb and evacuate nitrogen-rich gas from the second column B. In addition, the oxygen rich gas may be introduced into the feed end of the column B during the period extending between the end of step (iv) and the start of step (vi). A procedure may be adopted for introducing the oxygen rich gas into the feed end of column B analogous to that chosen for introducing oxygen rich gas into the column A.

If the PSA system for separating oxygen from air has 3 columns each containing a bed of molecular sieve adsorbent, introduction of the oxygen rich gas to each bed in turn may similarly be performed between the end of an equalization step and the start of a step in which feed air is supplied to the bed. In another alternative, the oxygen rich gas may be mixed with feed air, typically at an inlet to a compressor used to feed the air to the bed.

This technique is particularly useful if the PSA system adsorbs nitrogen at a pressure above atmospheric and then regenerates the adsorbent by reducing the pressure to atmospheric pressure. Alternatively, in such a 'pressure-atmosphere' cycle a low pressure blower can be used to urge the oxygen rich gas into the bed at a suitable juncture in each cycle, e.g. immediately before equalization in a two bed cycle.

Referring now to FIG. 3, there is shown an apparatus for treating the oxygen rich gas upstream of its supply to a PSA system. A pipeline 32 has an inlet that communicates with the vent 28 (see FIG. 1). The outlet of the pipeline 32 communicates with a packed contactor 34 in which the oxygen rich gas is contacted with ozone supplied via a pipeline 36. Contact with ozone is particularly desirable if the liquid received by the apparatus shown in FIGS. 1 and 2 is sewage. The ozone acts to clean the oxygen rich gas.

The cleaned oxygen rich gas leaves the contactor 34 and preferably passes into a conventional ozone destructor unit 42 which is adapted to remove all traces of ozone from the oxygen rich gas. The oxygen rich gas then enters a PSA system 40 and is utilized therein in the manner described above. If desired, the PSA system 40 may have a buffer vessel (not shown) in which the oxygen rich gas is received and from which it is supplied to the beds of the PSA system.

In a further embodiment, a portion of the oxygen rich product gas from the PSA system 40 may be supplied to an ozonizer (not shown) which supplies ozone to the contactor 34 via the pipeline 36.

From the forgoing, it will be appreciated that, although specific embodiments of the invention have been described herein for purposes of illustration, various modifications may be made without deviating from the spirit and scope of the invention. Accordingly, the invention is not to be limited except as by the appended claims.

What is claimed:

1. A method of dissolving a gas in a liquid comprising the steps of:

a) passing the liquid under a gas-tight enclosure;

b) causing the liquid to descend at a first velocity as a stream within the gas-tight enclosure through a first passageway;

c) passing bubbles of the gas at a second velocity from a source up through the descending liquid stream to dissolve the gas in the liquid stream to thereby form a gas-liquid stream, said second velocity exceeding said first velocity;

d) causing the gas-liquid stream to ascend through a second passageway within the gas-tight enclosure; and e) passing bubbles of said gas up through the ascending gas-liquid stream in said second passageway to dissolve a further quantity of said gas in the gas-liquid stream and to balance the liquid density and avoid excess pressure drop in the descending and ascending streams.

2. The method of claim 1 further comprising trapping any undissolved gas within the gas-tight enclosure.

3. The method of claim 2 further comprising recycling the trapped undissolved gas to step (c).

4. The method of claim 3 wherein the recycling step comprises pumping the trapped undissolved gas through a conduit connected to the source of the bubbles of gas.

5. The method of claim 2 wherein the undissolved gas is an oxygen rich gas, said method further comprising removing the oxygen rich gas from the gas-tight enclosure, mixing the oxygen rich gas with ozone to clean the oxygen rich gas and removing the ozone from the oxygen rich gas.

6. The method of claim 5 further comprising forwarding the clean, ozone free oxygen rich gas as a feed gas to a pressure swing adsorption system and forwarding the oxygen rich product gas from the pressure swing adsorption system to step (c).

7. The method of claim 6 further comprising converting a portion of the oxygen rich product gas obtained from the pressure swing adsorption system to ozone to mix with the oxygen rich gas obtained from the gas-tight enclosure.

8. The method of claim 1 wherein the gas is an oxygen rich gas.

9. The method of claim 8, further comprising trapping any undissolved oxygen rich gas within the gas-tight enclosure, withdrawing the trapped undissolved oxygen rich gas from the gas-tight enclosure, transferring the oxygen rich gas to a pressure swing adsorption system, and generating a second oxygen rich gas from the pressure swing adsorption system.

10. The method of claim 9, further comprising forwarding the second oxygen rich gas to step (c).

11. The method of claim 8 wherein the liquid is liquid sewage.

* * * * *